(12) United States Patent
Yang et al.

(10) Patent No.: US 6,731,206 B2
(45) Date of Patent: May 4, 2004

(54) FAILURE ANNOUNCING VOICE SYSTEM

(75) Inventors: Stephen Yang, Taipei Hsien (TW);
Chung-Fu Tsai, Taipei Hsien (TW);
Wen-Bin Liu, Taipei Hsien (TW)

(73) Assignee: First International Computer Inc., Taipei (TW)

( * ) Notice: Subject to any disclaimer, the term of this patent is extended or adjusted under 35 U.S.C. 154(b) by 137 days.

(21) Appl. No.: 10/034,327

(22) Filed: Dec. 28, 2001

(65) Prior Publication Data

US 2003/0126425 A1 Jul. 3, 2003

(51) Int. Cl.$^7$ ............................ G08B 23/00; G06F 11/00
(52) U.S. Cl. ....................... 340/500; 340/460; 340/692; 701/29; 701/31; 714/25; 714/36; 714/44; 714/57
(58) Field of Search ................................ 340/500, 460, 340/692; 701/29, 31, 34, 35; 714/25, 30, 31, 36, 44, 57

(56) References Cited

U.S. PATENT DOCUMENTS

| | | | | |
|---|---|---|---|---|
| 4,393,365 A | * | 7/1983 | Kondo et al. | 340/692 |
| 4,426,691 A | * | 1/1984 | Kawasaki | 369/21 |
| 4,438,422 A | * | 3/1984 | Nojiri et al. | 340/460 |
| 4,940,965 A | * | 7/1990 | Umehara | 340/460 |

* cited by examiner

Primary Examiner—Donnie L. Crosland
(74) Attorney, Agent, or Firm—Troxell Law Office PLLC

(57) ABSTRACT

A voice system for announcing the type of failure when the basic input/output system (BIOS) program in the computer discovers an error during start-up. The voice system includes a pre-recorded voice integrated circuit and a voice output device. The BIOS program tests a plurality of peripheral devices. When errors are found in any peripheral device, a warning signal is sent to the pre-recorded voice integrated circuit. A corresponding error signal message is looked up in the pre-recorded voice integrated circuit and then the error signal message is transferred to the voice output device. A verbal failure message is announced through the voice output device. The error signal message includes all kinds of failures recorded in voice data format.

2 Claims, 1 Drawing Sheet

FAILURE ANNOUNCING VOICE SYSTEM

BACKGROUND OF THE INVENTION

1. Field of Invention

The present invention relates to a voice system engaged during computer start-up. More particularly, the present invention relates to a voice system for announcing any failure during computer start-up.

2. Description of Related Art

When a computer is powered up, the central processing unit (CPU) inside the computer will execute a series of commands that can be functionally divided into three major categories.

1. System configuration analysis: analyzing the type of CPU, finding the memory size, obtaining information about the type and number of floppy disks and hard disks and determining if any floating point processor are present. The data thus gathered serve as references for subsequent operations.

2. Power on self test (POST): testing hardware state of various devices including memory, chipset, CMOS, stored data, keyboard and magnetic disk drives. If any errors are found, corresponding warning signals are issued.

3. Loading an operating system: through a small program called a 'bootstrap loader', relevant operating system on the hard drive is found and a portion of the operating system is loaded into the computer memory. Thereafter, control is returned to the operating system and the computer start-up operation formally ends.

The aforementioned group of commands is commonly referred to as a 'basic input and output system program' or BIOS for short. Hence, BIOS can be regarded as the first set of program commands executed after powering up a personal computer. If, somehow during computer start-up, the BIOS program could not execute to its completion, hardware problems are implied somewhere. These hardware problems must be removed before the computer can run normally and optimally.

However, BIOS designers of different manufacturers will use a program code slightly different from the BIOS in an IBM computer to formulate identical functions so that copyright infringement can be avoided. Thus, using the error signals of the aforementioned power on self test as an example, the following three tables show how the warning signals are defined according to three different computer manufacturers (IBM, AWARD, AMI) as follows:

| Beep Sound | Meaning |
|---|---|
| BIOS of IBM | |
| None | Power supply, CPU damages |
| Continuous beep | Memory damages |
| A short beep | System self testing, normal condition |
| 2 short beeps | Errors found in self test, errors displayed on screen |
| Continuous short beeps | Power supply, motherboard damages |
| 1 long 1 short beeps | Motherboard errors |
| 1 long 2 short beeps | Display errors |
| 1 long 3 short beeps | EGA card errors |
| 3 long beeps | Keyboard controller errors |
| BIOS of AWARD | |
| 1 short beep | No errors, system start-up |
| 1 long 2 short beeps | EGA card errors |
| 2 short beeps | Generation errors, display on screen |
| 1 long 3 short beeps | Keyboard controller errors |
| BIOS of AMI | |
| 1 beep | Memory return chip defects |
| 2 beeps | First 64K memory equivalent position errors |
| 3 beeps | Defects in first 64K memory prevent reading |
| 4 beeps | Timer on the motherboard malfunction |
| 5 beeps | CPU failure |
| 6 beeps | Keyboard controller failure, BIOS cannot step into protective mode |
| 7 beeps | CPU terminating abnormally |
| 8 beeps | Display memory region read/write errors |
| 9 beeps | ROM inspection value errors |
| 10 beeps | CMOS shut down register read/write errors |
| 11 beeps | Cache errors |

Note from the above tables that each personal computer (PC) manufacturer has a set of distinct warning sounds composed of a different combination of long, short and continuous beeping sounds. Since each PC manufacturer uses a different format and user may have difficulties in remembering the meaning of the sounds, user is slow to response to the warning messages and deal with the problem quickly.

SUMMARY OF THE INVENTION

Accordingly, one object of the present invention is to provide a voice system for announcing the type of failure when the basic input/output system (BIOS) program in the computer discovers an error during start-up.

The voice system for announcing the type of failure includes a pre-recorded voice integrated circuit and a voice output device. When error occurs during computer start-up, a warning signal is sent to the pre-recorded voice integrated circuit. A corresponding error signal message is looked up in the pre-recorded voice integrated circuit and then the error signal message is transferred to the voice output device. A verbal failure message is announced through the voice output device. The error signal message includes all kinds of failures recorded in voice data format.

Because the pre-recorded voice integrated circuit holds all kinds of failure in a voice format, reason for failure can be immediately broadcast once the BIOS program detects any error in the computer or peripheral devices. Hence, an operator may act on immediately to rectify the problem instead of guessing the meaning of beeps or checking each device in turn.

It is to be understood that both the foregoing general description and the following detailed description are exemplary, and are intended to provide further explanation of the invention as claimed.

BRIEF DESCRIPTION OF THE DRAWING

The accompanying drawing is included to provide a further understanding of the invention, and is incorporated in and constitutes a part of this specification. The drawing illustrates embodiments of the invention and, together with the description, serves to explain the principles of the invention. In the drawing.

DESCRIPTION OF THE PREFERRED EMBODIMENTS

Figure 1:
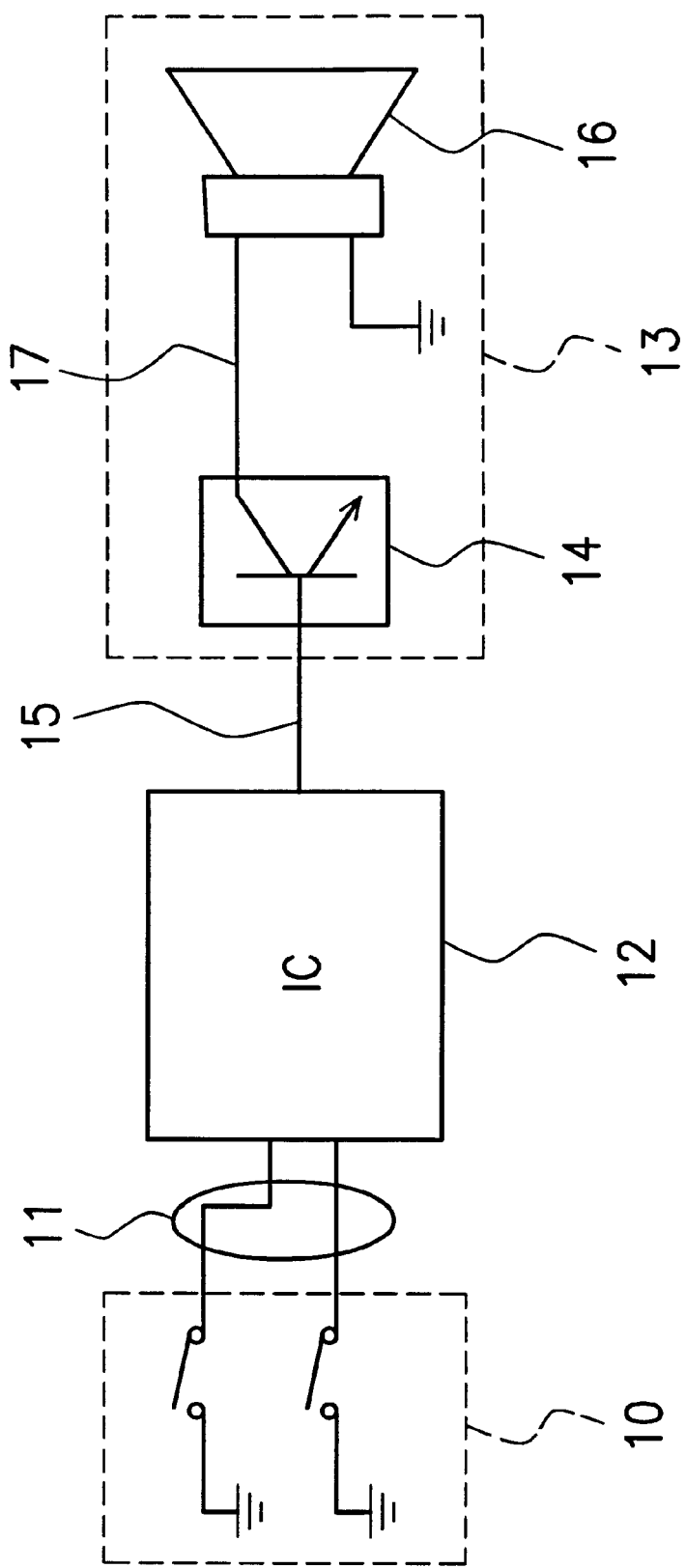
FIG. 1 is a circuit diagram of a voice system for announcing type of failure according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit diagram of a voice system for announcing type of failure according to one preferred embodiment of this invention. The voice system mainly includes a pre-recorded voice integrated circuit 12 and a voice output device 13. The voice output device 13 further includes an amplifier 14 and a loudspeaker 16.

First, when a computer is powered on, its internal basic input/output system (BIOS) program will take over to perform a series of testing. In the power on self test (POST), peripheral devices such as memory, chipset, CMOS, stored data, keyboard and magnetic disk drives are checked one by one. If an error is found, for example, no picture on display screen, CMOS battery low (insufficient battery power), hard disk install failure (hard drive cannot be driven), keyboard error or keyboard absent, the BIOS driver 10 will issue a warning signal 11 to the pre-recorded voice IC 12 from one of its controllable output ports via a switching device 10 shown in FIG. 1. In the subsequent step, a corresponding error signal message 15 is retrieved from the pre-recorded integrated circuit 12 and then sent to the amplifier 14 of the voice output device 13. An amplified signal 17 is then sent to the loudspeaker 16. The loudspeaker 16 announces the type of failure using the pre-recorded sound that corresponds to the error signal message. Ultimately, the operator of the computer system is able to find out the exact problem causing the failure and rectify the problem immediately.

In summary, this invention provides a voice system capable of reporting all types of errors occurring in the computer during start up. The invention is able to replace all kinds of beeping sound format produced by individual personal computer manufacturer with a uniform pre-recorded voice announcement so that a computer operator can learn about the problem quickly. In other words, an operator no longer has to guess the meaning of beeps or to check each device sequentially.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voice system for announcing a reason of failure that is determined by a basic input/output system (BIOS) driver with a BIOS program during a computer start-up, wherein the BIOS program tests a plurality of peripheral devices, the voice system comprising:

a) a warning signal produced by the BIOS program when an error is found in any one of the plurality of peripheral devices during the computer start-up;

b) a pre-recorded voice integrated circuit receiving the warning signal produced by the BIOS program, and selecting and outputting an error signal message corresponding to the warning signal; and c) a voice output device receiving the error signal message from the pre-recorded voice integrated circuit and outputting a verbal warning message, wherein the error signal message includes a description of the failures in voice format.

2. The voice system according to claim 1, wherein voice output device includes:

i) an amplifier receiving the error signal message and issuing an amplified signal; and ii) a loudspeaker receiving the amplified signal and audibly producing the verbal warning message.

* * * * *